United States Patent [19]

Goforth

[11] Patent Number: 4,805,865

[45] Date of Patent: Feb. 21, 1989

[54] MANUAL SEAT ADJUSTER WITH OVERCENTER LOCKING ELEVATION ADJUSTMENT

[75] Inventor: William R. Goforth, Pontiac, Mich.

[73] Assignee: General Motors Corporation, Detroit, Mich.

[21] Appl. No.: 86,553

[22] Filed: Aug. 18, 1987

[51] Int. Cl.⁴ .......................................... F16M 13/00
[52] U.S. Cl. ...................... 248/393; 248/397; 297/328
[58] Field of Search ............... 248/664, 669, 133, 139, 248/140, 141, 142, 371, 393, 397, 398, 157, 419, 421, 423; 297/328, 284

[56] References Cited

U.S. PATENT DOCUMENTS

| | | |
|---|---|---|
| 196,381 | 10/1877 | Pfluegner . |
| 2,527,905 | 10/1950 | Barecki ............................ 248/421 |
| 3,049,330 | 8/1962 | Coons ............................... 248/421 |
| 3,692,271 | 9/1972 | Homier ............................. 248/421 |
| 4,222,543 | 9/1980 | Gedig ............................... 248/421 |
| 4,438,895 | 3/1984 | Rees . |
| 4,445,661 | 5/1984 | Langmesser, Jr. . |

FOREIGN PATENT DOCUMENTS

| | | | |
|---|---|---|---|
| 2141116 | 3/1973 | Fed. Rep. of Germany ...... 297/328 |
| 2910442 | 11/1979 | Fed. Rep. of Germany ...... 248/398 |
| 2037578 | 7/1980 | United Kingdom ................ 248/419 |
| 2167113 | 5/1986 | United Kingdom ................ 248/421 |

Primary Examiner—J. Franklin Foss
Assistant Examiner—Robert A. Olson
Attorney, Agent, or Firm—Ernest E. Helms

[57] ABSTRACT

The present invention provides an apparatus and method of utilization of the same of a manual vehicle seat adjuster with an overcenter locking device for the seat adjuster elevational adjustment mechanism. The seat adjuster of the present invention provides locking of the elevational adjustment mechanism independent of any spring element.

13 Claims, 3 Drawing Sheets

MANUAL SEAT ADJUSTER WITH OVERCENTER LOCKING ELEVATION ADJUSTMENT

FIELD OF THE INVENTION

The field of the present invention is that of vehicle seats whose elevation can be adjusted manually. More particularly, the field of the present invention is manually adjustable height vehicle seats which are in addition adjustable in the fore and aft positions.

DISCLOSURE STATEMENT

Manual seat adjusters are well known in the art. Examples of manual vehicle seat adjusters are shown and illustrated in U.S. Pat. Nos. 4,438,895 to Reese and 4,445,661 to Langmesser et al., commonly assigned. Seat adjusters typically are utilized for the front row seats of a vehicle and are adjustable fore and aft. Additionally, some manual seat adjusters may also change the elevation of the seat providing four way seat adjustment. The mechanism used for vertical adjustment usually includes a side bracket fixed to the seat having an arcuate slot. A lever is pivotally mounted on the vehicle seat (typically via a seat channel) and is pivotally secured to the side bracket. The pivotal mounting of the lever is received through the slots of the side bracket. A lock plate for the lever is slidably mounted on the side bracket for movement to an engaged position where it engages a pivot pin (connected with the lever) projecting through the slot of the side bracket. The above locks the side bracket in a vertical adjusted position. A manually operated release mechanism selectively moves the lock plate against a spring to a release position to allow adjustment of the vertical height of the seat. A more detailed explanation of the above may be gained from a review of the above cited Reese patent.

It is desirable to provide a seat adjuster with a vertical height changing mechanism wherein a locking force retaining the seat adjuster at a given height is provided independent of any spring element. It is also desirable to provide an adjustment mechanism where a plurality of gear type teeth mesh with one another. Having a plurality of gear teeth meshing with one another allows the use of a smaller gear tooth engagement mechanism since all of the force of the seat is not projected through a single tooth member of the locking mechanism (plate) as it is in some of the prior seat adjusters.

SUMMARY OF THE INVENTION

To meet the above noted and other desires, the present invention is brought forth. The present invention in its preferred embodiment provides a manual vehicle seat adjuster wherein the mechanism providing adjustment in the elevation of the seat has an overcenter cam locking action providing locking of the vertical adjustment mechanism independent of any given spring biasing force. Additionally, the preferred embodiment seat of the present invention provides multi-tooth engagement allowing smaller incremental positioning. Furthermore, the weight of the seat and the seat occupant acting on the overcenter cam locking mechanism actually adds to the locking action preventing any undesired adjustment of the seat in the vertical direction.

It is an object of the present invention to provide an apparatus and method of utilization of the same of a manually adjustable vehicle seat adjuster having an adjustment means provided with an overcenter camming locking action.

It is an object of the present invention to provide a manual vehicle seat adjuster for adjusting the elevation of a seat including a first link holding the seat and being pivotally mounted with respect to the vehicle, a support link having first and second ends and being pivotally mounted with respect to the vehicle at the first end, a lock bar having first and second ends and being pivotally connected with the first link along the lock bar first end and the lock bar having means of selective engagement with the support link to set the elevation of the seat, an overcenter lock plate pivotally connected with the first link and pivotally urged into a position preventing pivotal movement of the lock bar away from engagement with the support link by contact of the lock bar with the overcenter lock plate, and means for sequentially pivoting the overcenter lock plate away from the lock bar and releasing the lock bar from engagement with the support link whereby the elevation of the seat can be adjusted.

It is an object of the present invention to provide a manual vehicle seat adjuster for adjusting the elevation of a seat and the fore and aft position of the seat, the adjuster including a floor channel connected with the vehicle, a seat channel slidably adjustable fore and aft on said floor channel with a latch mechanism for setting the position of the seat channel with respect to the floor channel, a first link holding the seat pivotally connected with the seat channel, and said first link having a longitudinal slot, a support link having first and second ends and being pivotally connected with the seat channel at the first end, a pawl lock plate pivotally connected adjacent the second end of the support link, the pawl lock plate having gear teeth and having a portion confined within the longitudinal slot of the first link, a lock bar having first and second ends and being pivotally connected with the first link along the first end and the lock bar having gear teeth for selective engagement with the pawl lock plate to set the elevation of the seat, an overcenter lock plate pivotally connected with the first link and contacted by the lock bar to be pivotally urged into a position preventing pivotal movement of the lock bar away from engagement with the pawl lock plate, and a cam plate pivotally connected with the first link and connected with a spring biased handle having direct cam engagement with the overcenter lock plate and lost motion cam engagement with the second end of the lock bar whereby a pull on the handle overcomes the biasing of the spring causing the cam plate to sequentially pivot the overcenter lock plate away from the lock bar and release the lock bar from engagement with the pawl lock plate whereby the elevation of the seat can be adjusted.

It is an object of the present invention to provide a method of adjusting the elevation of a vehicle seat with a seat adjuster including, holding the seat by a first link, pivotally mounting the first link with respect to the vehicle, pivotally mounting a support link with respect to the vehicle, pivotally connecting a first end of a lock bar having first and second ends to the first link and selectively engaging the lock bar second end with the support link to set the elevation of the seat, pivotally connecting with the first link an overcenter lock plate, contacting the overcenter lock plate with the lock bar for urging the overcenter lock plate into a position preventing pivotal movement of the lock bar away from engagement with the support link, pivoting the overcenter lock plate away from the lock bar, and releasing the lock bar from engagement with the support link whereby the elevation of the seat can be adjusted.

Other objects, desires and advantages of the present invention will become more apparent to those skilled in the art as the nature of the invention is better understood from the accompanying drawings and a detailed description

DETAILED DESCRIPTION OF THE DRAWINGS

Figure 1:
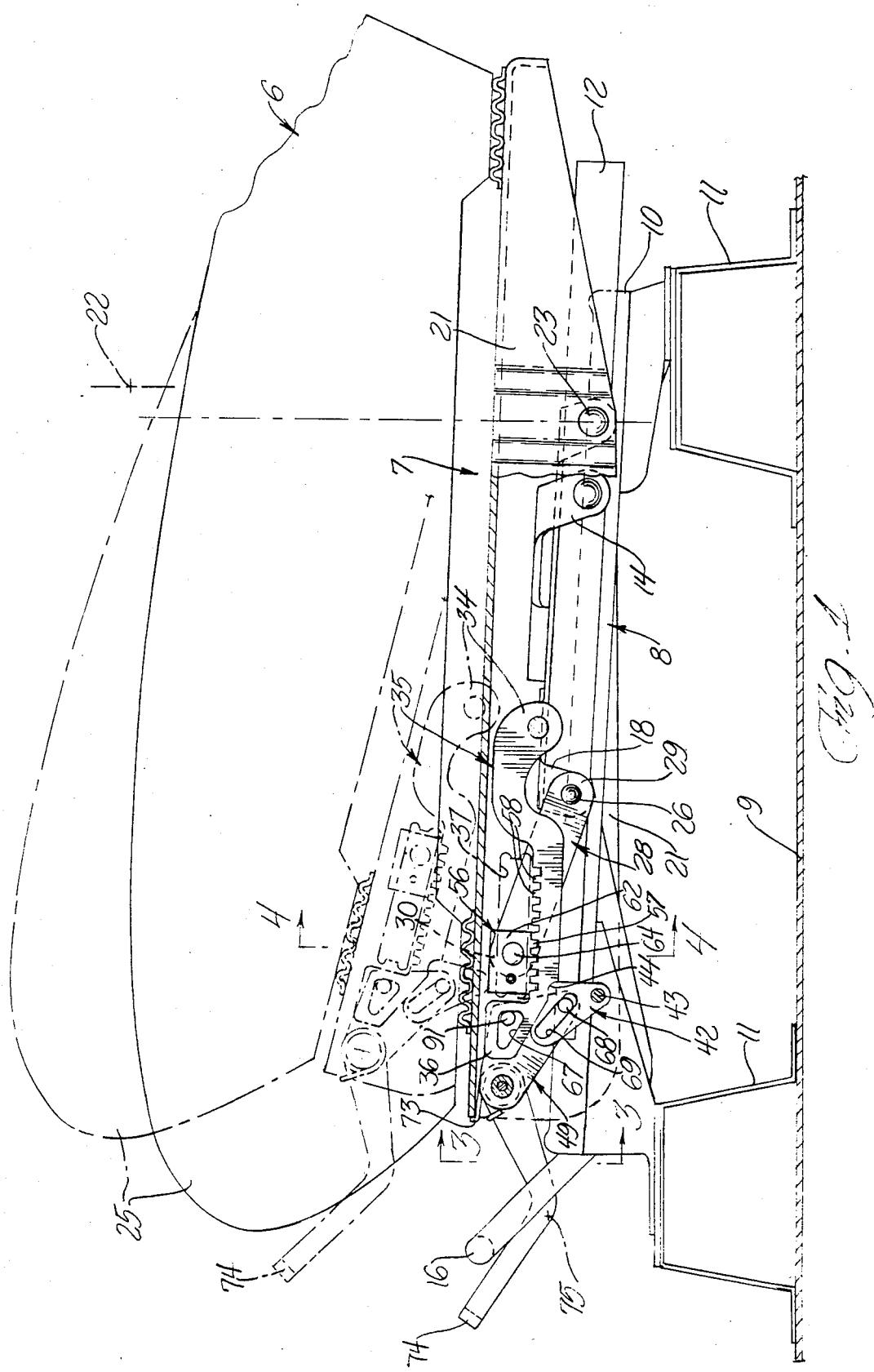
FIG. 1 a side sectional view mainly in side elevational a preferred embodiment vehicle seat adjuster of the present invention providing a four way seat adjuster.
Figure 2:
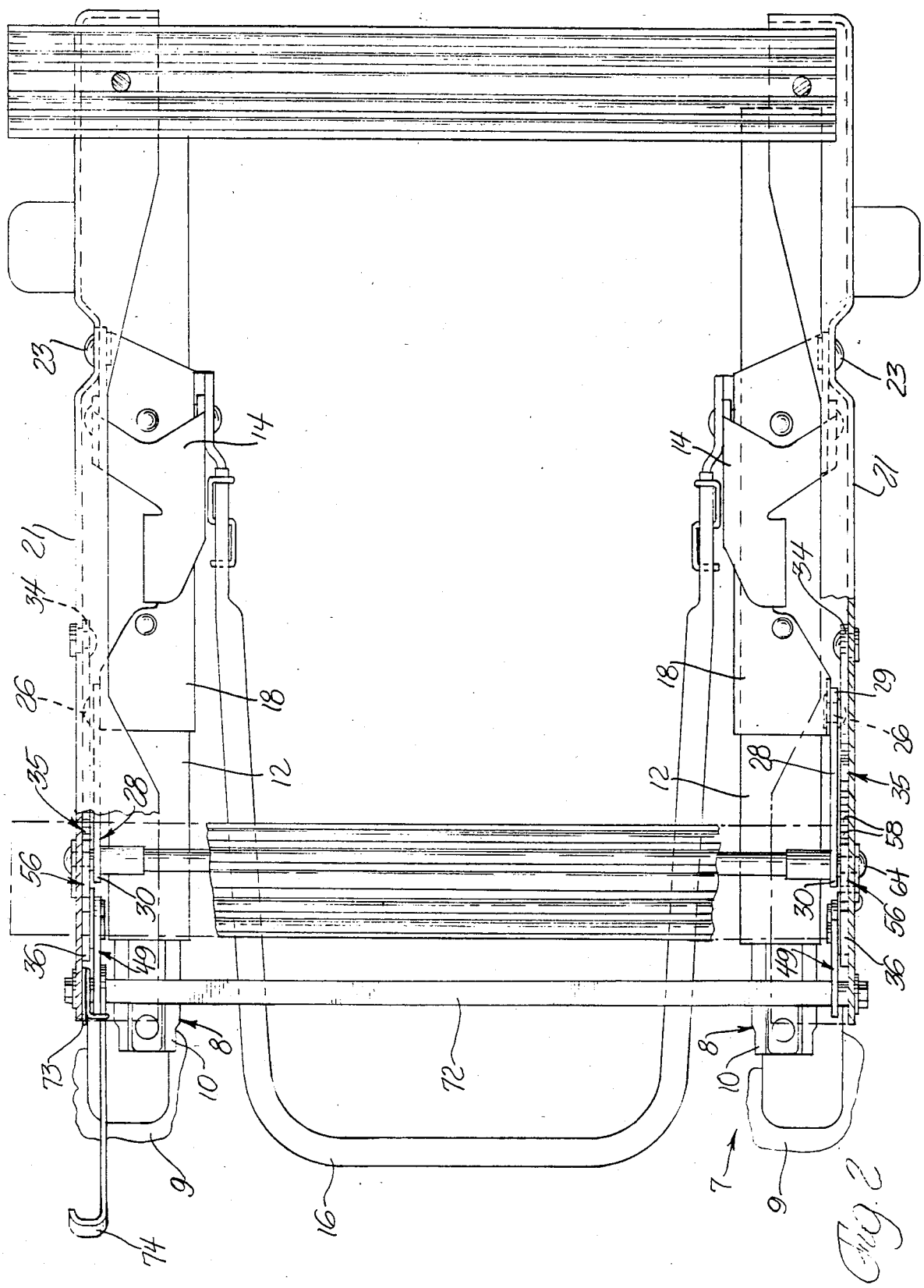
FIG. 2 a top sectional view mainly in top elevation of the seat adjuster shown in FIG. 1.
Figure 3:
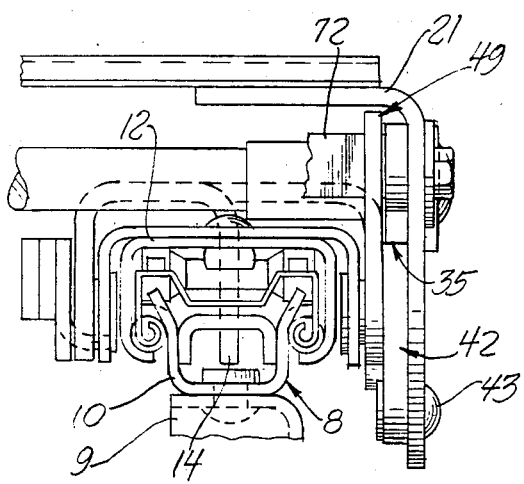
FIGS. 3 and 4 are taken along lines 3—3 and 4—4 of FIG. 1, respectively.
Figure 4:
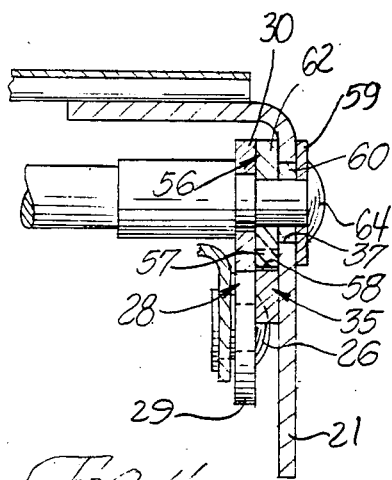

Referring to FIGS. 1, 2, 3 and 4 the seat adjuster 7 of the present invention is shown in the environment of a four way manual seat adjuster. The seat adjuster typically has two slider assemblies 8 mounted to the vehicle 9 in parallel underneath the seat 6. Since the operation of the slider assemblies 8 is essentially identical, the description of one will be given for the interest of brevity.

Mounted to the vehicle 9 floor on two supports 11 in a fore and aft direction is a floor plate or channel 10 (sometimes referred to as lower channel). Slidably mounted and adjustable in the fore and aft direction to a plurality of positions on the floor channel 10 is a top plate or seat channel 12 (sometimes referred to as an upper channel). The seat channel 12 has pivotally connected thereto a latch mechanism 14 (FIG. 2) which is manually operable by a handle 16 and can be selectively engaged with a series of notches in the floor channel 10 (not shown) to provide the adjustment mechanism fore and aft of the seat adjuster 7.

Fixably connected on top of seat channel 12 by a series of rivets is a saddle 18. A first link hereinafter referred to as side plate 21 holds the seat cushion 25. The side plate 21 is pivotally mounted with respect to the vehicle 9 via a pivotal connection 23 with saddle 18 slightly forward of the vertical position of the center of mass 22 of a typical seat occupant. The above position places the center of rotation (pivotal connection 23) of the seat 6 near the balancing point (center of mass 22) of the seat occupant, therefore the front portion of the seat may be easily raised by a slight movement backwards against the seat back (not shown) by a vehicle seat occupant.

Pivotally mounted to the vehicle 9 via a pivotal connection 26 to the saddle is a support link 28. The support link 28 has a first end 29 adjacent pivotal connection 26 and supports seat 6 when the seat 6 is elevated.

Pivotally connected along a first end 34 to the side plate 21 is a lock bar 35. Also pivotally connected to the side plate 21 is an overcenter lock plate 42 and a cam release plate 49. The side plate also has a longitudinal slot 37. Slidably mounted within the slot 37 and pivotally connected to a second end 30 of the support link is a pawl lock plate assembly 56. The pawl lock plate 56 assembly has a central member 62 (FIG. 4) having a series of gear type teeth 57.

The lock bar 35 along a second end 36 has a series of gear type teeth 58 for meshing together with the pawl plate gear teeth 57 to provide a means of selective engagement of the lock bar 35 with the support link 28 to set the elevation of the seat 6 (FIG. 1 phantom). Since several teeth 57, 58 are always in engagement, the teeth may be individually smaller than the teeth of previous adjustment mechanisms, thereby providing for more discrete incremental adjustment.

The pawl lock plate assembly 56 (FIGS. 1, 4 and 5) is a three piece member. An outer plate 59 captures a portion of the assembly called the slider plate 60 within the confines of side plate slot 37. Next to the slider plate 60 and attached thereto by pin fastener 61 is the central plate 62. Also extending thereto is a pin 64 which pivotally connects the pawl lock plate assembly 56 with a second end 30 of the support link 28. Therefore the central plate 62 is sandwiched between the outer plate 59, slider plate 60 and the support link 28. The above provides for secure meshing between teeth 58 and 57 and helps to prevent rattling of the seat adjuster 7.

The cam release plate 49 has a first pin 91 which fits within a widened slot 67 along the second end 36 of the lock bar 35 to provide a camming engagement with the lock bar 35. Cam release plate 49 also has lost motion with respect to lock bar 35 due to the wide clearance of first pin 91 with slot 67. Cam release plate 49 has a second pin 68 fitted within a slot 69 of the overcenter locking plate 42. However, the slot 69 of the overcenter locking plate 42 is very narrow, with respect to pin 68, therefore between cam release plate 49 and overcenter locking plate 42 there is direct motion cam engagement.

The lock bar 35 rests on top of and has contact with the overcenter locking plate 42 (FIG. 1) along section 44. A portion of the weight of the lock bar 35 (and the seat occupant) acts rearward of the point of pivotal connection 43 of the overcenter lock plate 42 with the side plate 21. The contact of lock bar 35 along section 44 with the overcenter lock plate 42 acts in a direction to pivot overcenter lock plate 42 clockwise (FIGS. 1 and 5) therefore urging overcenter lock plate 42 to a position preventing movement of the lock bar 35 away from engagement with the pawl lock plate assembly 56. To adjust the elevation of the seat 6, lock bar 35 must pivot away from pawl lock plate assembly 56. Therefore, the elevation of seat 6 is fixed until overcenter lock plate 42 is moved counterclockwise.

The overcenter lock plate 42 is captured between the side plate 21 and the cam release plate 49 to give the seat adjuster 7 greater stiffness and to prevent rattling. The cam release plate 49 is connected with a transverse shaft 72 which is in turn connected with a manually activated handle 74. The shaft 72 is spring biased by a torsion spring 73 to place the cam release plate 49 in a position to cause the overcenter lock plate 42 to be in a locking position. For synchronization shaft 72 is connected with both cam release plates 49 of the seat adjuster 7. Accordingly, only one torsion spring 73 is normally required. Handle 74 has a center of gravity 75 such that an acceleration of the seat 6 forward (with respect to the vehicle 9) will urge the handle 74 to rotate counterclockwise (FIG. 1) and to reinforce the locking action of the torsion spring 73.

The handle 74 in combination with the cam release plate 49 provides the means to sequentially pivot the overcenter lock plate 42 away from the lock bar 35 and to move the lock bar 35 from engagement with the support link 28 (via lock plate assembly 56).

Figure 5:
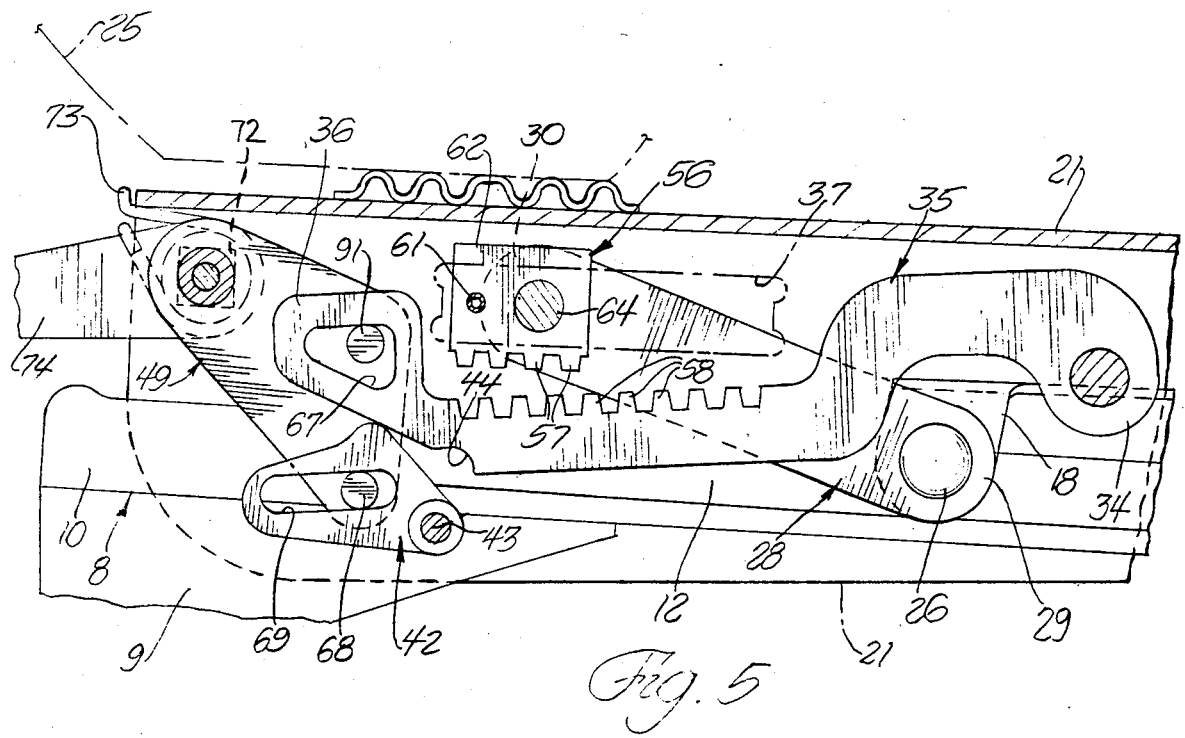
FIG. 5 is an enlarged cutaway operational view of a portion of the adjuster illustrated in FIG. 1.

To adjust the elevation of the seat 6 from the locked position shown in FIG. 1, solid line to FIG. 1 phantom position the handle 74 is selectively pulled upward to overcome the biasing of the torsion spring 73 (FIG. 5). Since cam release plate 49 has direct cam engagement with the overcenter lock plate 42, the pull of handle 72 immediately pivots the overcenter lock plate 42 counterclockwise away from contact with section 44 of the lock bar 35. Due to the curvature of section 44, the lock bar 35 does not have to pivot upwards (clockwise FIG. 5) for removal of the overcenter lock plate 42. After the pivoting of the overcenter lock plate 42, the lock bar 35 will pivot counterclockwise under from contact of first pin 91 with the inclined edge of slot 67. (The cam angle of approximately 7° retains teeth 58 and 57 in engagement before contact of first pin 91 with the inclined edge of slot 67.) The seat 6 may now be adjusted in elevation to the position shown in phantom. A release of the handle 74 allows the torsion spring 73 to return the lock bar 35 into positive engagement with the pawl plate assembly 56 via the cam release plate 42 (pin 91 will contact the top edge of slot 67). Also overcenter lock plate 42 will be repositioned into a locked position. The seat adjuster 7 will now be locked into the selected new elevation position.

The overcenter lock plate 42 provides locking independent of the torsion spring 73, therefore before the seat 6 may be adjusted in elevation the handle 74 must be pulled upward and the force supplied by torsion spring 73 is supplemental in nature.

The present invention provides a method of adjusting the elevation of a vehicle seat 6 with a seat adjuster 7, the method including the following steps:

1. Holding the seat 6 by a first link 21;
2. Pivotally mounting the first link 21 with respect to the vehicle 9;
3. Pivotally mounting a support link 28 with respect to the vehicle 9;
4. Pivotally connecting a first end of a lock bar 35 having first 34 and second 36 ends to the first link 21; and
5. Selectively engaging the lock bar second end 36 with the support link 28 to set the elevation of the seat 6;
6. Pivotally connecting with the first link 21 an overcenter lock plate 42;
7. Contacting the overcenter lock plate 42 with the lock bar 35 for urging the overcenter lock plate 42 into a position preventing pivotal movement of the lock bar away from engagement with the support link 28;
8. Pivoting the overcenter lock plate 42 away from the lock bar 35;
9. Releasing the lock bar 35 from engagement with the support link 28 whereby the elevation of the seat 6 can be adjusted.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A manual vehicle seat adjuster for adjusting the elevation of a seat, said adjuster in combination comprising:

a first link for holding said seat and for being pivotally mounted with respect to said vehicle;
   a support link having first and second ends for being pivotally mounted with respect to said vehicle at said first end;
   a lock bar having first and second ends and being pivotally connected with said first link along said lock bar first end and said lock bar having means of selective engagement with said support link to set the elevation of said seat;
   an overcenter lock plate pivotally connected with said first link and pivotally urged into a position preventing pivotal movement of said lock bar away from engagement with said support link by contact of said lock bar with said overcenter lock plate; and
   means for sequentially pivoting said overcenter lock plate away from said lock bar and releasing said lock bar from engagement with said support link whereby the elevation of said seat can be adjusted.

2. A seat adjuster as described in claim 1 having a lower channel for fixed connection to said vehicle and said support link and said first link are pivotally connected to an upper channel adjustable fore and aft over said lower channel.

3. An adjuster as described in claim 1 wherein said means for sequentially pivoting said overcenter lock plate and releasing said lock bar includes a cam plate pivotally connected with said first link and having direct cam engagement with said overcenter lock plate and lost motion cam engagement with said lock bar.

4. A seat adjuster as described in claim 1 wherein said lock bar means of selective engagement with said support link has a series of gear teeth and said support link at its second and has pivotally connected thereto a peel lock plate having gear teeth for meshing with said teeth on said lock bar.

5. A seat adjuster as described in claim 4 wherein said first link has a slot and said pawl lock plate has movement along said first link slot.

6. A seat adjuster as described in claim 1 having in addition another set of a first link, support link, lock bar, overcenter lock plate and means for sequentially pivoting said overcenter lock plate away from said lock bar and releasing said lock bar in parallel to the aforedescribed elements.

7. A seat adjuster as described in claim 1 wherein said pivotal mounting of said first link with said vehicle is slightly forward of the center of gravity of a seat occupant who occupies said seat.

8. A manual vehicle seat adjuster for adjusting the elevation of a seat and the fore and aft position of said seat, said adjuster in combination comprising:

a floor channel for connection with said vehicle;
   a seat channel slidably adjustable for and aft on said floor channel with a latch mechanism for setting the position of said seat channel with respect to said floor channel;
   a first line for holding said seat pivotally connected with said seat channel, and said first link having a longitudinal slot;
   a support link having first and second ends and being pivotally connected with said seat channel at said first end;
   a pawl lock plate pivotally connected adjacent said second end of said support link, said pawl lock plate having gear teeth and having a portion confined within said longitudinal slot of said first link;

a lock bar having first and second ends and being pivotally connected with said first link along said first end and said lock bar having gear teeth for selective engagement with said pawl lock plate to set the elevation of said seat;

an overcenter lock plate pivotally connected with said first link and contacted by said lock bar to be pivotally urged into a position preventing pivotal movement of said lock bar away from engagement with said pawl lock plate; and a cam plate pivotally connected with said first link and connected with a spring biased handle having direct cam engagement with said overcenter lock plate and lost motion cam engagement with said second end of said lock bar whereby a pull on said handle overcomes the biasing of said spring causing said cam plate to sequentially pivot said overcenter lock plate away from said lock bar and release said lock bar from engagement with said pawl lock plate whereby the elevation of said seat can be adjusted.

9. A seat adjuster as described in claim 8 wherein said overcenter lock plate is captured between said first link and said cam plate.

10. A seat adjuster as described in claim 8 wherein said pawl lock plate has connected thereto an outer plate capturing said pawl lock plate in said longitudinal slot of said first link between said outer plate and said support link.

11. A seat adjuster as described in claim 8 wherein said pawl lock plate has a plurality of teeth in engagement with said lock bar teeth in all elevations of said seat adjuster.

12. A seat adjuster as described in claim 8 wherein said first link and said support link are pivotally connected with said seat channel via a saddle fixably connected with said seat channel.

13. A method of adjusting the elevation of a vehicle seat with a seat adjuster, said method in combination comprising:

holding said seat by a first link;

pivotally mounting said first link with respect to said vehicle;

pivotally mounting a support link with respect to said vehicle;

pivotally connecting a first end of a lock bar having first and second ends to said first link; and selectively engaging said lock bar second end with said support link to set the elevation of said seat;

pivotally connecting with said first link an overcenter lock plate;

contacting said overcenter lock plate with said lock bar for urging said lock plate into a position preventing pivotal movement of said lock bar away from engagement with said support link;

pivoting said overcenter lock plate away from said lock bar; and releasing said lock bar from engagement with said support link whereby the elevation of said seat can be adjusted.

* * * * *